United States Patent [19]
McCall

[11] Patent Number: 5,363,699
[45] Date of Patent: Nov. 15, 1994

[54] METHOD AND APPARATUS FOR DETERMINING CHARACTERISTICS OF FLUID FLOW

[75] Inventor: Floyd McCall, Palm Springs, Calif.

[73] Assignee: Ketema, Inc., Hemet, Calif.

[21] Appl. No.: 112,756

[22] Filed: Aug. 25, 1993

[51] Int. Cl.$^5$ .................... G01F 15/00; F15D 1/02
[52] U.S. Cl. .................... 73/198; 138/37; 138/40; 239/74; 239/461
[58] Field of Search ........... 73/198, 861.04, 861.05; 138/37, 39, 40, 42; 239/71, 74, 461

[56] References Cited

U.S. PATENT DOCUMENTS

| | | | |
|---|---|---|---|
| 3,049,009 | 8/1962 | McCall et al. | 73/231 |
| 3,572,117 | 3/1971 | Rodely | 73/861.22 |
| 3,733,898 | 5/1973 | Yamamoto et al. | 73/198 |
| 4,576,204 | 3/1986 | Smallhorn et al. | 138/40 |
| 4,638,672 | 1/1987 | McCall | 73/861.52 |
| 4,812,049 | 3/1989 | McCall | 366/174 |

OTHER PUBLICATIONS

"McCrometer Flow Measurement Products-A Complete Line of Flowmeters for the Municipal Water and Wastewater Industry", Ketema, Inc., 1991.
"V-Cone Meter", Ketema, Inc., 1993.
"McCrometer Product Data-Fire Hydrant Flowmeter", Ketema, Inc., 1992.

Primary Examiner—Herbert Goldstein
Assistant Examiner—Harshad Patel
Attorney, Agent, or Firm—Juettner Pyle Lloyd & Piontek

[57] ABSTRACT

Highly reliable measurements of the fluid and/or fluid flow in a conduit are obtained by insertion within the conduit, upstream of a fluid measuring or sampling device, of a fluid flow straigntening and displacement apparatus which serves to stabilize, homogenize and condition the fluid flow and form at the device a uniform, axially centered, axially symmetrical, well defined and accurately measurable flow profile of large means flow diameter. The flow straightening and fluid displacement apparatus comprises, in sequence in the direction of fluid flow, a first swirl mitigating and flow straightening device, a fluid displacement member comprised of two oppositely facing frustums jointed at their larger ends and mounted coaxially within the conduit, and a second flow straightening device. Advantageous combinations of the flow straightening and fluid displacement apparatus with known measuring and sampling devices are provided.

22 Claims, 2 Drawing Sheets

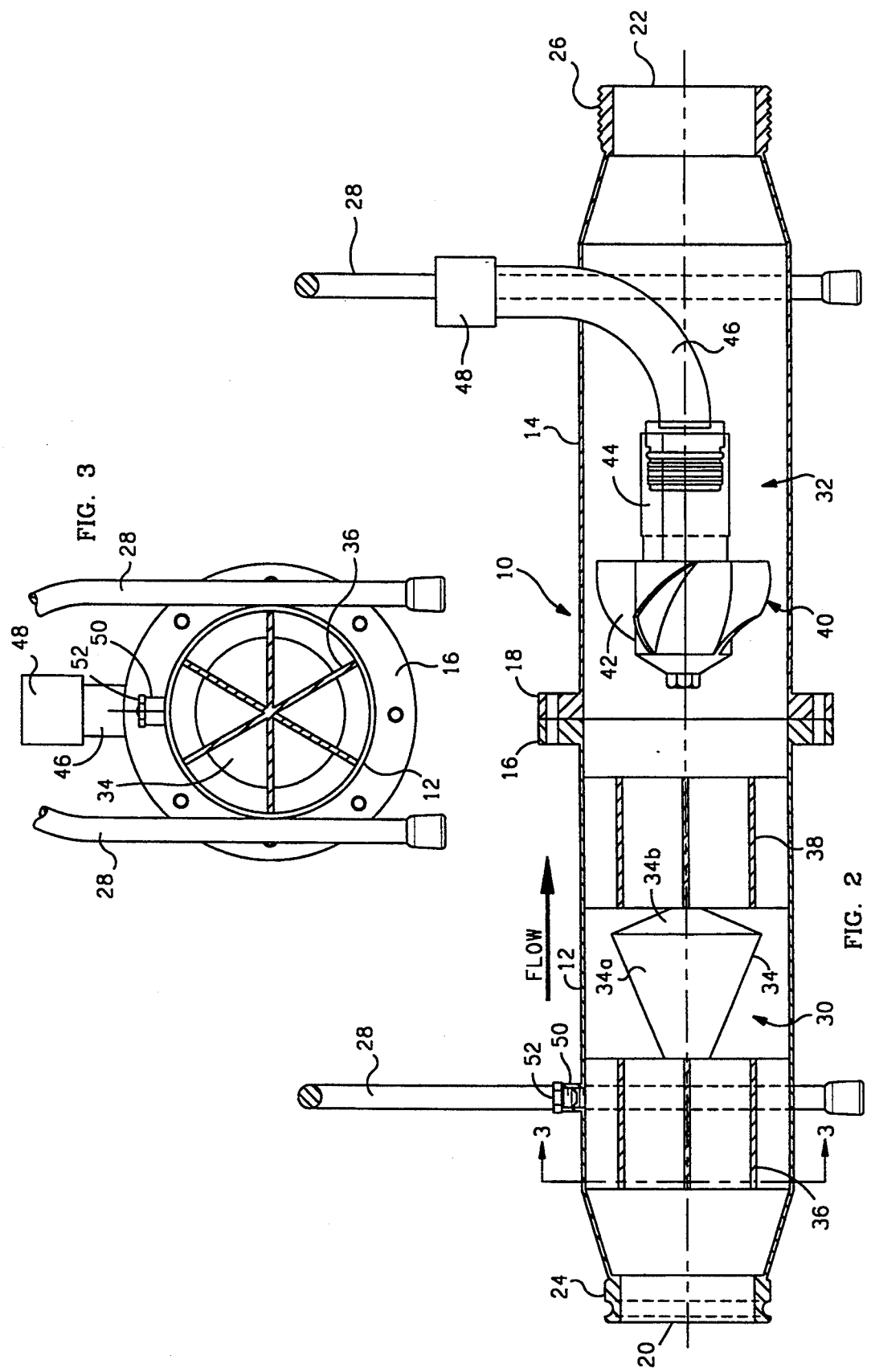

METHOD AND APPARATUS FOR DETERMINING CHARACTERISTICS OF FLUID FLOW

FIELD OF THE INVENTION

The present invention relates to methods and apparatus for determining characteristics of fluid flow within a conduit, and more particularly to a combination of method steps and apparatus elements for first conditioning, stabilizing and homogenizing the fluid flow within the conduit and for then measuring one or more characteristics of the fluid flow and/or for sampling the stabilized and homogenized fluid.

BACKGROUND

The present invention was conceived in the course of studying problems encountered in attempting to verify the water output capacity of fire department pumper units and fire hydrants. State governments require periodic certification of fire department pumper units to insure compliance with state regulations and specifications and the capability of the unit to respond to emergencies. Certification of fire hydrant outputs is likewise required for insurance rating purposes. Certification requires very precise and accurate measurement of the water flow, usually within an accuracy of plus or minus one percent.

In order to accurately measure fluid flow through a conduit, it is desirable to have a substantially flat face velocity profile of maximum mean flow diameter i.e., a diameter approaching or approximating the inner diameter of the conduit. When the face of the velocity profile becomes concave or convex, the mean flow diameter decreases, rendering it more difficult to secure an accurate flow measurement, because the flow is not uniform over the cross sectional area of the conduit.

If a nonuniform flow profile is symmetrical relative to the axis of the conduit, use of an impeller type fluid flowmeter having the axis of impeller rotation coaxial with the conduit may be useful, because the hub of the impeller obstructs the core of the fluid flow and aids in establishing a somewhat more uniform flow through the vanes of the impeller, i.e., through the annular space between the impeller hub and the inner wall of the conduit.

However, if the flow profile is not axially symmetrical and/or the core flow is distorted, a propeller or turbine type flowmeter cannot provide an accurate measurement. Moreover, the reduction in the cross sectional area of the flow path caused by the propeller hub creates backflow at the margins and the mean flow diameter becomes unstable and highly distorted making it very difficult to measure flow velocity.

The condition becomes even more exaggerated if the fluid flow is swirling, i.e., traveling in a helical or corkscrew path through the conduit. With a swirl condition, the flow is distorted and the mean flow diameter is greatly reduced and far off center relative to the axis of the conduit, rendering flow measurement highly inaccurate.

All of these conditions are encountered in fire department verification and certification studies. Water flow from fire hydrants and fire department pumper units is usually highly distorted and has a major swirl factor. Similarly, a curve in a fire hose will distort the flow and impart a swirl to the flow, either a left hand swirl or a right hand swirl depending upon the direction of the curve in the path of water travel. Consequently, verification measurements of water output capacity and flow rates have required highly sophisticated equipment, and have been time consuming and expensive. Simpler, more reliable, more accurate and less expensive verification systems have been sought.

Impeller type rotary flowmeters are highly regarded in the flow measurement industry and usually provide a reliable and particularly economical system for measurement of fluid flow. It would be beneficial if the same could be used with a higher level of accuracy and reliability in conducting verification and certification studies, especially when encountering problematic flow conditions such as those above discussed.

The inventor herein named has previously developed a number of impeller or propeller type rotary flowmeters which are made and sold by the McCrometer Division of Ketema, Inc., Hemet, Calif. Some of these meters include flow straighteners adjacent the propeller for mitigating swirl in the fluid flow as the fluid passes the impeller, for example, longitudinally extending tube bundles or angularly spaced longitudinally extending vanes. See for example U.S. Pat. No. 3,049,009 for a disclosure of flow straightening vanes conformed to the frontal face of an impeller. Fire hydrant water meters containing such flow straighteners tend to reduce the swirl of the water emanating from the hydrant, but measurement of water consumption is not sufficiently reliable to be used for purposes of verification and certification.

The inventor herein has also developed a static device which has been used for measuring fluid flow, see U.S. Pat. No. 4,638,672, and for mixing diverse fluids, see U.S. Pat. No. 4,812,049. Fluid flowmeters and static mixers embodying the patented device are made and sold by the McCrometer Division of Ketema, Inc. under the registered trademark "V-CONE".

SUMMARY OF THE INVENTION

The present invention is predicated upon and resides in a new use of the V-CONE device and a new combination of elements for obtaining consistent and highly reliable flow measurements. Though developed and herein described in terms of fire department pumper verification requirements, the invention has a broad range of commercial and industrial applications for resolving flow measurement requirements under problematic fluid flow conditions.

One object of the invention is to provide a new and improved combination of fluid flow control and measurement devices for resolving problematic fluid flow conditions within conduits and for facilitating accurate determination of one or more characteristics of the fluid and/or fluid flow as the fluid passes through the conduit.

Another object of the invention is to apply the V-CONE device to a new use for preconditioning, stabilizing and homogenizing a fluid flowing within a conduit for converting an unstable and distorted flow profile to a substantially uniform, consistent and symmetrical profile having a large and axially centered mean flow diameter.

A further object of the invention is to upgrade the performance and thereby enhance the reliability and scientific value of relatively economical measurement or sampling instruments by preconditioning the fluid flow within the conduit so as to provide to the instrument a flow profile ideally suited for measurement by the instrument.

In its preferred embodiment, the apparatus of the invention is comprised of the combination within a section of pipe or conduit, in sequence in the direction of fluid flow, of a fluid flow stabilizing and conditioning device and a device for determining a characteristic of the stabilized and preconditioned fluid flow.

The flow stabilizing and conditioning device comprises a flow displacement member of smaller size than the conduit comprised of two frustums joined at their larger ends and mounted coaxially within the conduit substantially normal to the direction of fluid flow and with their peripheries spaced symmetrically inwardly from the interior or inner wall of the conduit. The displacement member deflects the fluid and causes the fluid to flow through an annular region of progressively decreasing area and then progressively increasing area and is effective to substantially linearize the velocity profile of the fluid over a predetermined range of flow rates. Fluid flow is thereby stabilized both upstream and downstream from the member.

The inwardly sloped wall of the frustum at the downstream side of the displacement member is effective to optimize the return velocity of the fluid as it returns to free stream conditions in the conduit downstream of the displacement member. Consequently, the flow profile downstream from the displacement member is relatively flat, symmetrical, of large mean flow diameter and axially centered within the pipe or conduit. Moreover, the mean flow diameter remains constant and does not change with variations in the velocity of fluid flow.

The fluid displacement member is also effective to homogenize the fluid stream, whether liquid, gaseous or with entrained solids, i.e., to thoroughly mix and render essentially homogeneous a mixture of two or more fluids and/or a fluid with entrained solid matter. Thus, the flow mixture will be essentially homogeneous throughout the downstream fluid flow profile. Consequently, the determination of a characteristic of the fluid or the fluid flow may be accurately determined within this region.

The device for determining a characteristic of the fluid or fluid flow is located within the conduit a short distance downstream from the fluid displacement member, with a preferred spacing being in the order of a few pipe or conduit diameters. The characteristic determining or detecting device may be a fluid sampling device or a flow measuring device. In the preferred embodiment for fire department verification studies, the device is an impeller type fluid flowmeter which drives either or both of an instantaneous flow rate indicator and a totalizing register.

Due to the fact that the fluid flow at the impeller is stabilized and homogeneous, and the flow profile is uniform, of large and constant mean diameter, and axially centered within the conduit, the flowmeter or other measuring instrument will provide an accurate and highly reliable measurement of water flow, such as required for purposes of verifying the water output capacity of fire hydrants and fire department pumper units. The performance, and therefore the commercial and scientific value of the measuring instrument, are thereby upgraded and enhanced.

Thus, the invention provides a very simple, small and compact, and yet highly accurate and reliable system for ascertaining and verifying fluid flow through a conduit with a system accuracy of one percent or better.

Fire department and similar verification and certification studies can therefore be conducted in a very economical manner and within a relatively short time span. Additional applications will be manifest to persons of reasonable skill in the art.

In addition to the foregoing, the invention also provides a simple and economical system for obtaining mass flow measurements of Newtonian or substantially Newtonian fluid flows. In particular, by equipping the flow displacement member with means, such as a transducer, for determining the pressure drop across the member, and by utilizing a flowmeter downstream from the member to determine fluid velocity, measurements can be made of the mass or weight of the fluid flow through the conduit.

The invention therefore provides for ascertainment of a variety of fluid flow characteristics in a practical and economical manner.

These and other objects and advantages of the invention will become apparent to those of reasonable skill in the art from the following detailed description, as considered in connection with the accompanying drawings.

BRIEF DESCRIPTION OF THE DRAWINGS

FIG. 2 is a vertical longitudinal section of the preferred embodiment of the apparatus illustrated in FIG. 1; and FIG. 3 is a vertical cross section of the apparatus taken substantially on line 3—3 of FIG. 2.

DETAILED DESCRIPTION

Figure 1:
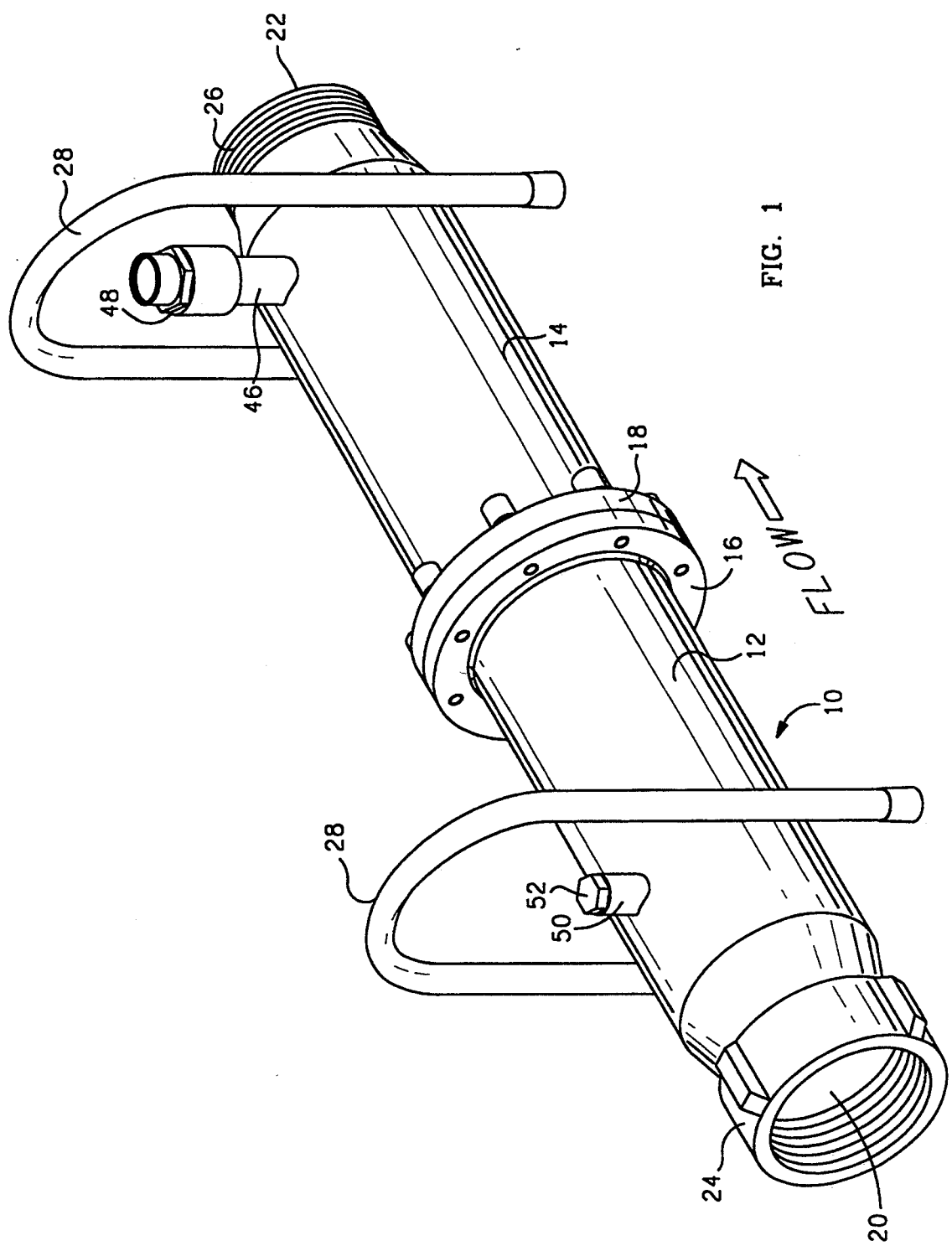
FIG. 1 is a perspective view of the apparatus of the invention as embodied in a fire department pumper verification system.

The following is a detailed description of a preferred embodiment of the invention presently contemplated by the inventor to be the best mode of carrying out his invention. Modifications, changes and variations therein will become apparent to those of reasonable skill in the art as the description proceeds.

Referring to the drawings, an embodiment of the invention especially suited for use as a fire department pumper verification system is shown as comprising a section of pipe or conduit 10 which is preferably formed in two halves 12 and 14 bolted together at mating flanges 16 and 18 welded to the confronting ends of the respective halves 12 and 14. As indicated by the arrow, the direction of fluid flow through the conduit is from an inlet 20 at the free end of the conduit half 12 to an outlet 22 at the free end of the conduit half 14. The conduit is provided at the inlet 20 with a female coupling 24 for attaching the conduit to the outlet of a fire hydrant or water pump or to the outlet end of a length of fire hose. The conduit is provided at the outlet 22 with a male fitting 26 for attachment thereto of a fire hose.

Fire hydrant outlets and fire hose fittings have a standardized diameter of 2 ½ inches, so the coupling 24 and fitting 26 are made of this same diameter. Because the volume and velocity of fluid flow are so great, it is desirable to have a larger diameter conduit within which to conduct fluid flow measurements. Accordingly, the conduit halves are made of a larger diameter, preferably four inches, with frustoconical transitions between the 2 ½ and 4 inch diameters. The increased conduit diameter also serves to mitigate cavitation in the flow measuring chamber.

To facilitate handling of the flowmeter in the field, each conduit half 12 and 14 is provided with an inverted U-shaped handle 28. The two legs of each handle are welded to opposite sides of the respective conduit half and extend below the conduit to also comprise a stand for supporting the flow meter in an upright horizontal position when it is not coupled to a hydrant or pump outlet.

Referring to FIG. 2, the upstream half 12 of the conduit 10 houses flow conditioning, stabilizing and homogenizing means, indicated generally at 30, and the downstream conduit half 14 houses a means, indicated generally at 32, for determining or detecting a characteristic of the fluid or the fluid flow. In the illustrated embodiment, the means 32 comprises an impeller or propeller type of fluid flowmeter.

The flow conditioning means 30 is comprised primarily of a fluid displacement member 34 which is available under the trademark "V-CONE" from the McCrometer Division of Ketema, Inc., Hemet, Calif. The displacement member itself, as applied to other uses, is shown and described in detail in U.S. Pat. Nos. 4,638,672 and 4,812,049, the disclosures of which are incorporated herein as though here set forth in full.

In essence, the displacement member 34 is comprised of two oppositely facing frustums 34a and 34b which, at their larger ends, are of the same diameter and fixedly secured to one another. The upstream frustum 34a is longer than the downstream frustum 34b and is formed at an angle in the order of from about 39 degrees to about 75 degrees to the plane defined by the periphery of the joined ends of the two frustums, a preferred angle being in the order of about 67.5 degrees. The angle of the downstream frustum relative to the plane defined by the periphery of the joined ends of the frustums is preferably in the order of about 22°. The Beta number of the member 34 relative to the inner diameter of the conduit 12 is preferably in the order of from about 0.5 up to about 0.94.

The displacement member 34 is of a smaller diameter than the conduit 12 and is mounted coaxially within the conduit, with the plane defined by the peripheral edge of the joined ends of the frustums normal to the direction of fluid flow, and with the sloped walls of the two frustums spaced symmetrically inwardly from the interior or inner wall of the conduit.

As fluid, e.g., water, enters the conduit inlet 20 under pressure, the fluid is displaced or deflected by the upstream frustum 34a of the member 34 into an annular region of progressively decreasing cross sectional area, to a minimum area at the periphery of the joined ends of the two frustums. The fluid then flows into an annular region of progressively increasing area as defined by the downstream frustum 34b. As a consequence, the fluid flow is stabilized and conditioned both upstream and downstream from the member 34. Also, the fluid or fluids and any solid materials therein are homogenized so that the conduit downstream from the member 34 is filled with an essentially homogeneous mixture throughout substantially its full cross sectional area.

In particular, the fluid displacement member 34 is effective to linearize the velocity profile of the fluid flow over a broad range of flow rates, and the downstream frustum is effective to optimize the return velocity of the fluid as it returns to free stream conditions in the conduit downstream from the member. Consequently, the downstream flow profile is relatively flat, symmetrical, axially centered within the conduit, and of a large and essentially constant mean flow diameter irrespective of flow rate. Flow deviation is in the order of about 1 percent or less. A constant fluid flow profile is therefore provided downstream from the member 34, thereby to facilitate accurate measurement of flow conditions.

The peripheral edge defined by the joined ends of the two frustums in conjunction with the downstream frustum causes short vortices to be shed from the peripheral edge in the downstream direction. These vortices are of small amplitude and high frequency and thereby contribute to optimization of the return velocity of the fluid flow. Vortices of small amplitude and high frequency effectively eliminate extraneous downstream disturbances or so-called "noise", and thereby facilitate highly accurate and reliable measurements. Thus, the V-CONE displacement member upgrades the downstream measurement device.

The displacement member 34 may be mounted axially within the conduit 12 by any suitable means, such as one or more spider mounts or a curved elbow mounting arm or tube extending through the wall of the conduit as illustrated in U.S. Pat. Nos. 4,638,672 and 4,812,049. However, in view of the extreme degree of swirl encountered in water discharge from a fire hydrant or hose, it is advisable in this particular application to provide means for assisting the displacement member 34 in eliminating swirl. In the preferred embodiment illustrated in FIGS. 2 and 3, the member 34 is mounted axially within the conduit half 12 by means of flow straightening vanes, preferably a first set of vanes 36 at the upstream end of the member and a second set of vanes 38 at the downstream end of the member. The frustums 34a and 34b may suitably be welded or otherwise joined at their smaller diameter ends to the vane sets 36 and 38, respectively.

As shown in FIG. 3, each vane set is preferably comprised of six circumferentially and equally spaced vanes radiating outwardly from the axis to the inner wall of the conduit half 12. The total longitudinal dimension of the vanes should be no more than about one and one-half times the diameter of the conduit. In the preferred embodiment, each vane set 36-38 has a length equal to about one-half the conduit diameter.

The two vane sets thereby comprise part of the flow stabilizing means 30, wherein the joined frustums provide correction for turbulence and flow profile and the vanes assist the displacement member in correcting for swirl. Consequently, the fluid flow approaching the detecting means 32 is fully stabilized and preconditioned.

The fluid characteristic detecting or determining means 32 may be mounted within the conduit 10 at any desired spacing downstream from the displacement member 34 up to about ten times the diameter of the conduit, depending upon the fluid, the flow conditions and the characteristic to be determined. However, for maximum benefit, the means 32 is preferably mounted within about 2 to 3 diameters downsteam from the displacement member 34, i.e., about 1 to 3 diameters downstream from the disclosed stabilizing means 30. The segmented construction of the conduit in two halves facilitates use of the flow stabilizing means with a variety of measuring and sampling systems.

In the preferred embodiment illustrated for verification of the output capacity of fire hydrants and fire department pumper units, the means 32 comprises an impeller or propeller type of fluid flow meter 40 having means for registering fluid flow on a flow totalizing register and/or an instantaneous flow rate indicator. One flowmeter particularly suitable for the application comprises the impeller and register system of the Model M1104 flowmeter available from the McCrometer Division of Ketema, Inc.

As shown in FIG. 2, the flowmeter 40 comprises a propeller 42 of a diameter slightly smaller than the inner diameter of the conduit half 14 mounted on an axis of rotation coincident with the axis of the conduit and the axis of the fluid displacement member 34.

In the illustrated structure, the propeller is rotatably mounted on an electrical pick-up unit 44 which is mounted axially within the conduit on the end of a curved elbow or mounting arm or tube 46 which extends radially through and is welded to the wall of the conduit half 14 downstream from the propeller 42 and pick-up unit 44. Electrical conductors (not shown) extend through the tube 46 from the pick-up unit 44 to a terminal block or fitting 48 mounted on the outer end of the tube 46. The block or fitting 48 contains terminals for electrical connection to a meter including either or both a total flow register and a flow rate indicator. If desired for exceptional accuracy, the pick up unit 44 may be a solid state sensor for generating digital pulses which are transmitted from the terminal block 48 to an appropriate data processing unit such as a computer or microprocessor. Such instrumentation is not illustrated in the drawings as the same are conventional in the flow measurement industry. With the components described, the overall system accuracy, i.e., the combined accuracy of the hydraulic, mechanical electrical and/or electronic systems, is 99% or better. All system errors combined are 1% or less.

As is known, the totalizing register may provide a reading in gallons, cubic feet, acre feet, cubic meters and other standard measurements. Similarly, the flow rate indicator may provide a reading in gallons per minute, cubic feet per second and other standard measures.

As an alternative to an electrical or electronic pick-up and register system, the propeller may have a direct mechanical drive to a register and indicator by means of a flexible shaft extending through the tubular mounting arm 46 from the propeller 42 to a register (not shown) mounted directly on the outer end of the support elbow 46. This form of drive affords an advantage in the field in that it is self contained and requires no electrical power for the register system.

In use, the propeller 42 is rotated by the fluid flowing through the conduit 10 at a speed proportional to the rate of flow. The propeller thereby detects and provides a measure of the velocity of fluid flow. With the diameter of the conduit being known, the volume of flow is readily determined.

Moreover, by adding means for measuring the pressure drop at a known restriction in the conduit, a mass flow measurement of Newtonian or substantially Newtonian fluid flows may be obtained as a function of the pressure differential and the velocity of the fluid. In a preferred apparatus, the pressure differential is measured across the fluid displacement member 34 by means of a transducer (not shown) in the manner described in detail in U.S. Pat. No. 4,638,672, which disclosure is incorporated herein by reference. For the purpose, an access port 50 (which in the illustrated structure is normally closed by a plug 52) is provided in the wall of the conduit half 12 to facilitate the installation of the means for sensing the pressure drop across the member 34. With the pressure differential and velocity of flow thus determined, the mass or weight of the fluid flow through the conduit may readily be computed, either as a mass rate of flow or the total weight of fluid flow or both. In contrast to known art, the invention provides for mass flow measurement in an extremely short lineal run. Mass flow measurement is a very valuable adjunct for a large number of industrial processing operations, such as food processing plants.

Thus, the invention provides for accurate measurement of a variety of fluid flow conditions and characteristics.

In applications other than fire department pumper verification systems, the flow stabilizing and conditioning means 30 of the invention may be utilized to stabilize and condition fluid flow for a variety of purposes, and to enhance the accuracy, reliability and performance of other fluid measurement systems and instruments.

The medium flowing through the conduit 10 may be gaseous, liquid or viscous, or combinations thereof, and may as well contain entrained particulate or solid matter. In substantially all cases, the means 30 will be effective to homogenize the flow and to stabilize and condition the flow into a constant, axially centered, flat faced flow profile at the outlet of the conduit half 12. Consequently, a variety of measurements can be obtained accurately and reliably within the conduit half 14.

The objects and advantages of the invention have therefore been shown to be attained in a convenient, economical and practical manner.

While the preferred embodiment of the invention has been herein illustrated and described, it is to be appreciated that various changes, rearrangements and modifications may be made therein without departing from the scope of the invention, as defined by the appended claims.

What is claimed is:

1. Apparatus for determining characteristics of fluid flow comprising, in combination,
    a conduit for conveying a fluid therethrough in a given direction,
    and within said conduit, in sequence in the direction of fluid flow,
    means for stabilizing and conditioning the fluid flow and providing within said conduit a substantially uniform flow profile having a large and axially centered mean flow diameter,
    said flow stabilizing and conditioning means comprising a fluid flow displacement member of smaller size than said conduit comprised of two frustums joined at their larger ends and mounted coaxially in said conduit substantially normal to the direction of fluid flow and with the peripheries of said frustums spaced symmetrically inwardly from the conduit, said displacement member deflecting the fluid and causing the fluid to flow through a region defined between the peripheries of said frustums and the inner wall of the conduit and being effective to substantially linearize the velocity profile of the fluid over a predetermined range of flow rates through said conduit, and
    means downstream from said flow stabilizing and conditioning means for determining a characteristic of the stabilized and conditioned fluid flow.

2. Apparatus as set forth in claim 1 wherein said flow stabilizing and conditioning means includes means for mitigating swirl of the fluid flowing through the conduit.

3. Apparatus as set forth in claim 2, including swirl mitigating means at both the upstream and downstream sides of said fluid flow displacement member.

4. Apparatus as set forth in claim 2, wherein said swirl mitigating means comprises spaced wall means extending longitudinally of and dividing a portion of the interior of said conduit into a plurality of longitudinally extending passages.

5. Apparatus as set forth in claim 4, wherein the longitudinal extent of said wall means is in the order of up to about one and one-half times the inner diameter of said conduit.

6. Apparatus as set forth in claim 3 wherein said swirl mitigating means are mounted within said conduit and said fluid flow displacement member is mounted on said swirl mitigating means substantially coaxially within said conduit.

7. Apparatus as set forth in claim 1 wherein said means for determining a characteristic of the stabilized and conditioned flow comprises fluid sampling means.

8. Apparatus as set forth in claim 1, wherein said means for determining a characteristic of the stabilized and conditioned flow comprises a fluid flowmeter.

9. Apparatus as set forth in claim 8, wherein said fluid flowmeter comprises a flow responsive rotor mounted coaxially within said conduit.

10. Apparatus as set forth in claim 1, wherein said means for determining a characteristic of the stabilized and conditioned flow is spaced downstream from said flow stabilizing and conditioning means by a distance no greater than about ten times the inner diameter of the said conduit.

11. Apparatus as set forth in claim 10, wherein the spacing between said means for determining a characteristic of the stabilized and conditioned flow and said flow stabilizing and conditioning means is in the order of from about 1 to 3 times the inner diameter of said conduit.

12. A process for conditioning and stabilizing fluid flow within a conduit at a location within the conduit at which a fluid measurement is to be taken, comprising the steps of inserting within the conduit upstream from said location a fluid flow displacement member of smaller size than the conduit comprised of two frustums joined at their larger ends and mounted coaxially in the conduit substantially normal to the direction of fluid flow and with the peripheries of the frustums spaced symmetrically inwardly from the inner wall of the conduit, and deflecting the fluid flowing through the conduit through an annular region defined between the peripheries of the frustums and the inner wall of the conduit for substantially linearizing the velocity profile of the fluid over a predetermined range of flow rates through the conduit and for providing at said location a substantially constant flow profile having a large and axially centered mean flow diameter.

13. A process as set forth in claim 12 including the step of inserting the fluid flow displacement member within the conduit upstream from said location at a distance from said location that is no greater than about ten times the inner diameter of the conduit.

14. A process as set forth in claim 12 including the step of inserting the fluid flow displacement member within the conduit upstream from said location at a distance from said location that is equal to from about 1 to about 3 times the inner diameter of said conduit.

15. A process as set forth in claim 12 including the step of inserting swirl mitigating means within the conduit adjacent the flow displacement member.

16. A process as set forth in claim 15 including the step of inserting swirl mitigating means within the conduit both upstream and downstream of the flow displacement member.

17. A process as set forth in claim 12 including the step of measuring the fluid flow through the conduit at said location.

18. A process as set forth in claim 17 including the step of measuring a pressure differential at a predetermined position within the conduit and determining from the fluid flow and the pressure differential the mass flow through the conduit.

19. A process as set forth in claim 18 including the step of measuring the pressure differential between the upstream and downstream sides of the fluid flow displacement member.

20. A process for measuring the mass of a fluid flowing through a conduit, comprising the steps of:

inserting within the conduit a fluid flow displacement member of smaller size than the conduit comprised of two frustums joined at their larger ends and mounted coaxially in the conduit substantially normal to the direction of fluid flow and with the peripheries of the frustums spaced symmetrically inwardly from the inner wall of the conduit, deflecting the fluid flowing through the conduit through an annular region defined between the peripheries of the frustums and the inner wall of the conduit for substantially linearizing the velocity profile of the fluid over a predetermined range of flow rates through the conduit, measuring the pressure differential between the upstream and downstream sides of the displacement member, inserting a flowmeter within the conduit downstream of the displacement member at a location where the velocity profile of the fluid is linearized and stable, measuring with the flowmeter the velocity of fluid flow through the conduit, and determining from the measured pressure differential and the measured velocity of flow the mass of fluid flow through the conduit.

21. A process for stabilizing and conditioning fluid flow within a conduit comprising the steps of inserting within the conduit a flow straightening device for mitigating swirl of fluid flowing through the conduit, inserting a fluid flow displacement member within the conduit immediately downstream from the flow straightening device, the fluid flow displacement member being of smaller size than the conduit, comprised of two frustums joined at their larger ends, and mounted coaxially in the conduit substantially normal to the direction of fluid flow and with the peripheries of the frustums spaced symmetrically inwardly from the inner wall of the conduit, and causing the fluid flowing through the conduit to flow through the flow straightening device for mitigating swirl of the fluid flow and then deflecting the fluid through an annular region defined between the peripheries of the frustums and the inner wall of the conduit for substantially linearizing the velocity profile of the fluid over a predetermined range of flow rates through the conduit and for providing at a location downstream from the displacement member a substantially constant flow profile having a large and axially centered mean flow diameter.

22. Fluid flow stabilizing and conditioning apparatus comprising, in combination, a conduit for conveying a fluid therethrough in a given direction, and within said conduit, in sequence in the direction of fluid flow, first flow straightening means for mitigating swirl of fluid flowing through the conduit, a fluid flow displacement member of smaller size than said conduit comprised of two frustums joined at their larger ends and mounted coaxially in said conduit substantially normal to the direction of fluid flow and with the peripheries of said frustums spaced symmetrically inwardly from the conduit, said displacement member deflecting the fluid and causing the fluid to flow through a region defined between the peripheries of said frustums and the inner wall of the conduit and being effective to substantially linearize the velocity profile of the fluid over a predetermined range of flow rates through said conduit, and second flow straightening means, said first and second flow straightening means mounting said displacement member coaxially in said conduit.

* * * * *